United States Patent [19]

Pryamilov et al.

[11] 4,259,153
[45] Mar. 31, 1981

[54] DEVICE FOR REMOVAL OF FUEL ASSEMBLIES AND CANS OF CONTROL AND SAFETY SYSTEM FROM CORE OF NUCLEAR REACTOR

[76] Inventors: Jury S. Pryamilov, ulitsa Shalyapina, 20, kv. 176; Nikolai A. Nikolaichev, ulitsa Krasnykh Zor, 6, kv. 16; Gennady V. Negin, ulitsa Berezovskaya, 73, kv. 5; Vsevolod Y. Duntsev, ulitsa Shalyapina, 15, kv. 81; Robert M. Krylov, ulitsa Shalyapina 8, kv. 11; Vladimir I. Shiryaev, ulitsa Strazh Revoljutsii, 22, kv. 19, all of Gorky, U.S.S.R.

[21] Appl. No.: 7,194

[22] Filed: Jan. 29, 1979

Related U.S. Application Data

[63] Continuation of Ser. No. 800,290, May 25, 1977, abandoned.

[51] Int. Cl.$^3$ ............................................. G21C 19/20
[52] U.S. Cl. .................................. 176/30; 294/86 A; 414/146
[58] Field of Search ............................. 176/30, 31, 32; 414/146; 294/86 A

[56] References Cited

U.S. PATENT DOCUMENTS 3,253,995  5/1966  Antonsen ............................. 176/30

Primary Examiner—Donald P. Walsh
Attorney, Agent, or Firm—Fleit & Jacobson

[57] ABSTRACT

The proposed device for the removal of fuel assemblies and control and safety system cans from the core of a nuclear reactor comprises a hollow bar, wherein there is installed a main grip adapted for axial movement relative to the bar. At the end of the hollow bar, which faces an element to be withdrawn, there is mounted an auxiliary grip. The internal diameter of the hollow bar is selected so that the latter can envelop the elements being removed from the reactor's core. The length of the bar is selected so that the auxiliary grip can reach the jammed end of an element being withdrawn from the core, while the main grip holds the head of the element.

5 Claims, 6 Drawing Figures

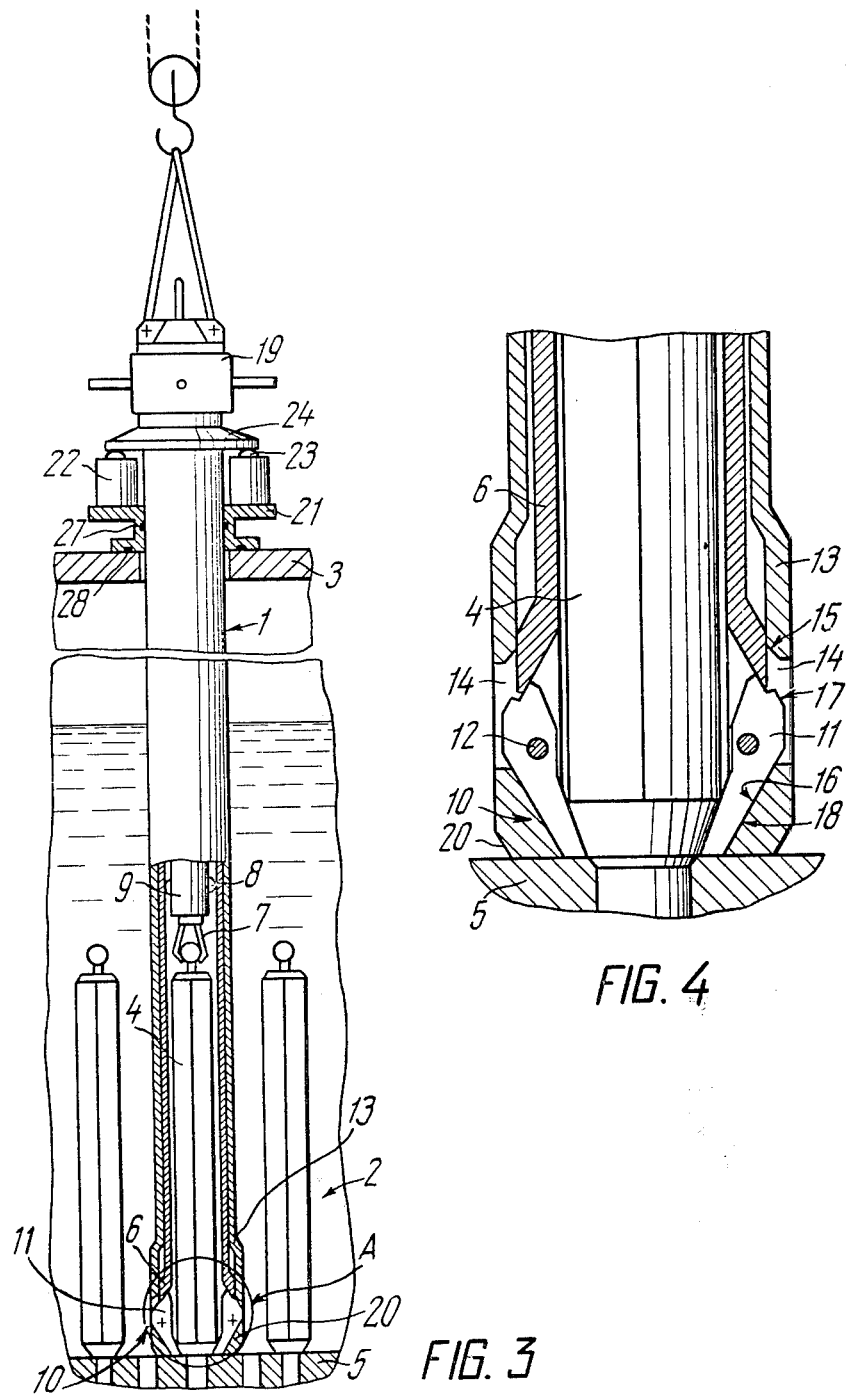

DEVICE FOR REMOVAL OF FUEL ASSEMBLIES AND CANS OF CONTROL AND SAFETY SYSTEM FROM CORE OF NUCLEAR REACTOR

This is a continuation of application Ser. No. 800,290, filed May 25, 1977, now abandoned.

The present invention relates to fuel recharging devices of nuclear reactors and, more particularly, to devices for the removal of fuel assemblies and cans for rods of the control and safety system from the core of a nuclear reactor, primarily, a fast reactor with liquid metal coolant.

There is known a device for the removal of fuel assemblies and cans of the control and safety system from the core of a nuclear reactor, comprising a hollow bar, wherein there is arranged a grip intended to interact with the head of a fuel assembly. The grip is coupled to the hollow bar by a means which makes it possible for the grip to move along the bar's axis. This type of fuel recharging device is the commonest in the existing nuclear reactors.

Devices for the removal of fuel assemblies from nuclear reactor cores, provided with grips to grip fuel assemblies by their heads, make it possible to grip and withdraw from the nuclear reactor core any of densely packed fuel assemblies.

In high-power fast reactors, fuel assemblies and cans of the control and safety system are exposed to a powerful integrated fast-neutron flux which causes swelling and affects the mechanical properties of the materials of fuel assemblies arranged in the reactor core. The high temperature of the liquid metal coolant in the core also causes deformations and affects the mechanical properties of the materials of fuel assemblies.

A change in the geometrical parameters of fuel assemblies may cause jemming of the tails of fuel assemblies in collector holes (sockets) of the core. If in an attempt to remove a fuel assembly jammed in its socket, the latter is gripped by the head, there is the danger that the fuel assembly may break in the middle, because it is precisely the middle of a fuel assembly that has the highest temperature and is exposed to the highest integrated fast-neutron flux, while the reactor is in operation.

It is an object of the present invention to provide a device for the removal of fuel assemblies and cans of the control and safety system from the core of a nuclear reactor, which would make it possible to withdraw from the reactor core even such fuel assemblies that are jammed in their sockets, without destroying the assemblies.

The foregoing object is achieved by providing a device for the removal of fuel assemblies and cans of the control and safety system from the core of a nuclear reactor, comprising a hollow bar, wherein there is arranged a grip adapted for axial movement along the bar's axis and intended to interact with the head of a fuel assembly to be removed, which device is characterized, according to the invention, by that the internal diameter of the hollow bar makes it possible for the bar to envelop elements being removed, while at the end of the bar, which faces the element being removed, there is mounted an auxiliary grip intended to interact with the outer surface of the element being removed, the length of the bar being sufficient for the auxiliary grip to reach the end of the element being removed, while the main grip is on the head of the element, which is at the opposite end of that element.

It is advisable that a sleeve member be fitted over the hollow bar, which would envelop the auxiliary grip and be adapted for axial movement relative to the hollow bar, and that the sleeve member be provided with openings in a number corresponding to that of the jaws of the auxiliary grip, each of said openings being arranged opposite one jaw of the auxiliary grip and having profiled surfaces to interact with external profiled surfaces of the jaws of the auxiliary grip.

It is desirable that both the hollow bar and the sleeve member be provided with at least one longitudinally extending slot having a length not less than that of elements to be removed, the location and width of the slot being determined by the shape, size and arrangement of elements in the reactor core.

The proposed device for the removal of fuel assemblies and cans of the control and safety system from the core of a nuclear reactor rules out breaking jammed fuel assemblies and cans of the control and safety system in the course of their removal from the reactor core, which is due to the fact that fuel assemblies and cans are gripped by their lower portion which is to a lesser extent exposed to the effects of high temperatures and the integrated fast-neutron flux.

The provision of longitudinal slots in the hollow bar and the sleeve member makes it possible for the auxiliary grip to reach the lower end of an element being removed even if some of the adjacent element are jammed.

Other objects and advantages of the present invention will be more readily understood from the following detailed description of preferred embodiments thereof to be read in conjunction with the accompanying drawings, wherein:

FIG. 3 is a cut-away general elevation view of a device for the removal of fuel assemblies and cans of the control and safety system from the core of a nuclear reactor and of a part of the reactor, taken at a moment a fuel assembly to be removed is gripped by its head and lower end, in accordance with the invention;

FIG. 4 is a magnified view of the area A of FIG. 3;

In the text of the present disclosure, the term "can of the control and safety system" is to be understood as a housing, wherein a rod of the control and safety system is installed. When in the housing, the dimensions of the rod are equal to those of a fuel assembly. The device of this invention can be used to remove both empty cans and cans containing rods of the control and safety system; it can also be used to remove fuel assemblies.

Figure 1:
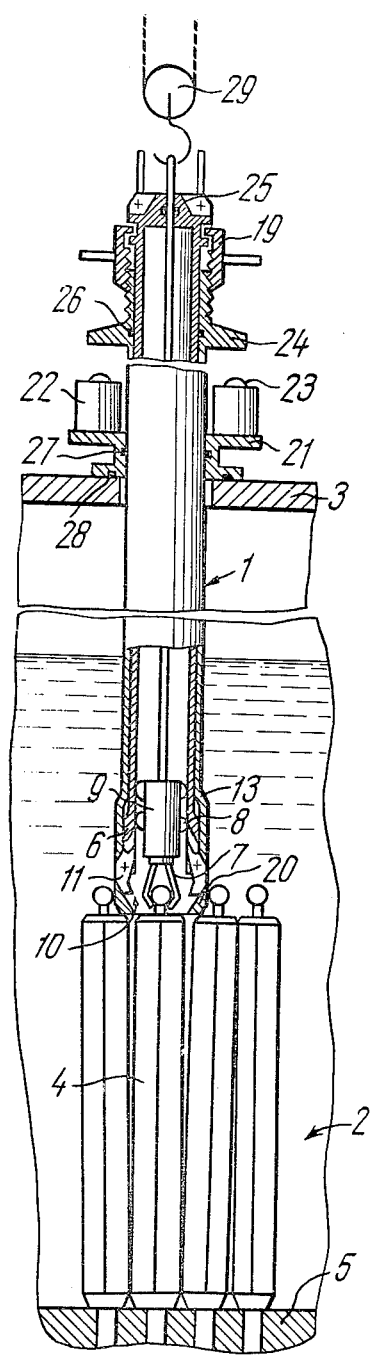
FIG. 1 is a general elevation view of a device for the removal of fuel assemblies and cans of the control and safety system from the core of a nuclear reactor and of a part of the reactor, taken at a moment a fuel assembly to be removed is gripped by its head, in accordance with the invention.

The proposed device 1 for the removal of fuel assemblies and cans of the control and safety system from the core 2 of a nuclear reactor, shown in FIG. 1, is installed in a cover 3 of the nuclear reactor, over the core 2 containing fuel assemblies 4 secured in sockets of a collector 5.

The device 1 includes a hollow bar 6, wherein there is arranged a grip 7 intended to grip the fuel assembly 4 by its head to withdraw said fuel assembly 4 from the reactor core 2. The grip 7 is coupled to the hollow bar 6 by means of rollers 8 arranged in a housing 9 of the grip 7 at an angle of 120° relative to each other and interacting with the internal surface of the hollow bar 6. As a result, the grip 7 is centered in relation to the axis of the hollow bar 6 and is movable along said axis of the hollow bar 6 over a distance which is not less than the length of the fuel assemblies 4. The internal diameter of the hollow bar 6 enables the bar 6 to envelop the fuel assembly 4 so that there is a clearance between the bar 6 and the fuel assembly 4 being removed; as a result, the fuel assembly 4 can freely move inside the hollow bar 6 over the entire length of said fuel assembly 4. On the core-facing end of the hollow bar 6 there is mounted an auxiliary grip 10. A magnified view of the auxiliary grip 10 is presented in FIG. 2. The auxiliary grip 10 is intended to grip the lower ends of the fuel assemblies 4 being removed (FIG. 1). The grip 10 (FIGS. 1 and 2) comprises six jaws 11 movable mounted on axles 12 which are rigidly secured in the hollow bar 6. Fitted over the hollow bar 6 is a sleeve member 13 which envelops the auxiliary grip 10 and is adapted for axial movement in relation to the hollow bar 6. The bar 6 is sufficiently long for the auxiliary grip 10 to reach the end of the fuel assembly 4 being removed, while the main grip 7 is on the head of said fuel assembly 4, which is at the opposite end of the fuel assembly 4. Opposite each of the jaws 11, there is an opening 14 (FIG. 2) in the sleeve member 13. Each opening 14 has bevelled sides 15 and 16 to interact with external surfaces 17 and 18, respectively, of the jaws 11, bevelled so as to correspond to the profile of the bevelled surfaces 15 and 16.

Figure 2:
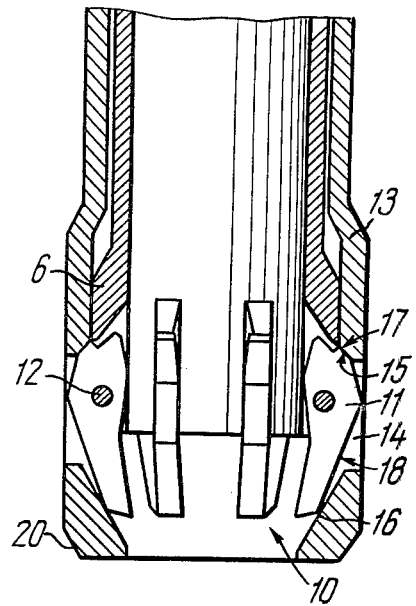
FIG. 2 is an elevation view of the sleeve member and the auxiliary grip with open jaws, in accordance with the invention.

In FIG. 2, the auxiliary grip 10 is opened; the bevelled external surfaces 17 of the jaws 11 interact in this case with the bevelled sides 15 of the openings 14.

The hollow bar 6 (FIG. 1) is coupled to the sleeve member 13 by means of a nut 19 which makes it possible for the hollow bar 6 to axially move with respect to the sleeve member 13 over a distance necessary to close (open) the jaws 11 of the auxiliary grip 10. At the end of the sleeve member 13, on the side of the auxiliary grip 10, there is provided an external conical surface 20 (FIG. 2) intended for centering the main grip 7 relative to the axis of the fuel assembly 4 being removed, as the latter is gripped by its head.

On the sleeve member 13 there is mounted a support 21 (FIG. 1) which is slidable along the axis of the sleeve member 13 and is secured on the cover 3 of the nuclear reactor. Mounted on the support 21 are hydraulic cylinders 22 which provide enough traction to extract the assembly 4 from the collector 5, as the auxiliary grip 10 grips the lower end of the fuel assembly 4. To withdraw the fuel assembly 4, rods 23 of the hydraulic cylinders 22 interact with stops 24 rigidly mounted on the sleeve member 13. In the portions of the hollow bar 6 and the sleeve member 13, extending above the cover 3 of the reactor, and in the support 21 there are installed sealings 25, 26, 27 and 28 to prevent the penetration of air into the nuclear reactor, as well as a discharge of contaminated gas from the nuclear reactor into the atmosphere.

FIG. 3 shows the device of FIG. 1, the only difference being that the fuel assemblies, adjacent to the fuel assembly 4 being withdrawn, have been removed, and the hollow bar 6 with the auxiliary grip 10 and the sleeve member 13 is lowered to the stop into the collector 5; the auxiliary grip 10 is released.

FIG. 4 shows the area A of FIG. 3; the bevelled external surfaces of the jaws 11 of the auxiliary grip 10 interact with the bevelled sides 16 of the openings 14 provided in the sleeve member 13.

Figure 5:
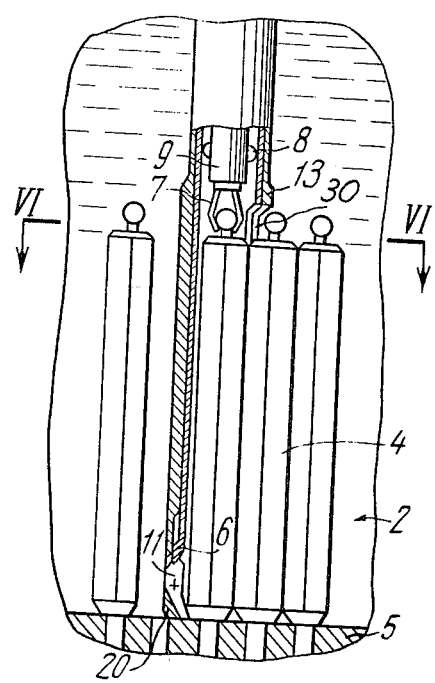
FIG. 5 is an elevational view of an embodiment of the proposed device for the removal of fuel assemblies and cans of the control and safety system from the core of a nuclear reactor with one longitudinally extending slot interacting with an element being removed, in accordance with the invention.

FIG. 5 shows an alternative embodiment of the proposed device for the removal of fuel assemblies and cans of the control and safety system from the core of a nuclear reactor. The device of FIG. 5 is used to remove jammed adjacent fuel assemblies. FIG. 5 only shows part of this device, located just above the core 2 of the nuclear reactor. According to this second embodiment, the hollow bar 6 and the sleeve member 13 are provided with a longitudinally extending slot 30 to receive the fuel assembly 4 which is adjacent to the one being removed. As a fuel assembly is received in the slot 30, there is a clearance between said fuel assembly and the walls of the slot 30. The slot 30 is somewhat longer than the fuel assembly 4; in all other respects, the device of FIG. 5 is similar to that of FIG. 1.

Figure 6:
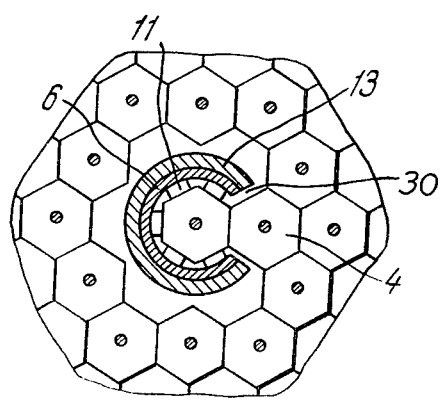
FIG. 6 is a sectional view taken on line VI—VI of FIG. 5.

FIG. 6 is a sectional view taken on line VI—VI of FIG. 5 and shows the arrangement of the slot 30 with respect to the jammed fuel assembly 4; all the adjacent fuel assemblies have been removed. The width of the slot 30 is determined by the size of the fuel assembly 4.

The hollow bar 6 and the sleeve member 13 may be provided with several slots 30 arranged at an angle to one another. The number, arrangement, shape and dimensions of the slots 30 depend on the arrangement, shape and dimensions of the fuel assemblies 4 to be withdrawn from the reactor core 2.

The device provided with the slots 30 can also be used to extract single jammed fuel assemblies 4.

The proposed device 1 (FIG. 1) for the removal of fuel assemblies and cans of the control and safety system from the core 2 of a nuclear reactor operates as follows.

In order to remove unjammed fuel assemblies 4 from the reactor core 2, the device 1 is oriented in the known manner with respect to the coordinates of the fuel assembly 4 to be removed. After this, the sleeve member 13, the hollow bar 6 and the opened auxiliary grip 10 are lowered with the aid of a drive 29 until they abut against the upper end faces of the fuel assemblies 4 adjacent to the one that has to be removed. The sleeve member slides under gravity with respect to the support 21; at the end of its travel it interacts with its external conical surface 20 with the heads of the fuel assemblies 4 adjacent to the one that is to be extracted and thus accurately centers the main grip 7 relative to the axis of the fuel assembly 4 to be removed. It also forces the adjacent fuel assemblies 4 aside from the one that is to be removed; the width of the clearance corresponds to the overall design of the fuel assemblies 4. The main grip 7 is then lowered with the aid of the same drive 29 onto the head of the fuel assembly 4 to be removed, grips the head and draws it. As this takes place, the force directed into the hollow bar 6 is limited so as not to destroy the fuel assembly 4 being removed. The drive 29 then raises the sleeve member 13, the hollow bar 6, the opened auxiliary grip 10 and the fuel assembly 4 being removed, gripped by the main grip 7, somewhat above the heads of the fuel assemblies 4 in the reactor core 2, and the device 1 is oriented with respect to the coordinates of the socket, wherein the fuel assembly 4 being removed is to be inserted. The removed fuel assembly 4 is installed in its socket in a similar manner, although the sequence of operations in this case is reversed.

As fuel assemblies are being removed from the core of a nuclear reactor, there may be a situation when a fuel assembly is jammed in the collector so that it cannot be taken out by using the traction force developed by the main grip 7.

In such a case, all the fuel assemblies 4 that are adjacent to the jammed one are first removed from the core 2 (FIGS. 1 and 3) of the nuclear reactor, which is done as described above.

After this, the device 1 is oriented in the known manner with respect to the coordinates of the jammed fuel assembly 1. The sleeve member 13, the hollow bar 6 and the opened auxiliary grip 10 move down by gravity and with the aid of the drive 29. As this takes place, the sleeve member freely slides in the support 21, whereas the fuel assembly 4 to be removed enters the hollow bar 6. As the end face of the sleeve member 13 abuts against the collector 5, the auxiliary grip 10 grips the fuel assembly 4 by its lower end, which is done by rotating the nut 19. The rotation of the nut 19 causes downward movement of the hollow bar 6 with respect to the sleeve member 13. As this takes place, the bevelled surfaces 18 of the jaws 11 (FIG. 4) of the auxiliary grip 10 slide along the bevelled sides 16 of the openings 14 provided in the sleeve member 13. Upon reaching the end face of the collector 5, the grip 10 closes and firmly grips the lower end of the fuel assembly 4 (FIG. 3). The main grip 7 is then lowered onto the head of the fuel assembly 4 being removed and grips it by the head.

In order to provide the necessary traction force to withdraw the fuel assembly 4 from its socket in the collector 5, working fluid is directed under pressure into the hydraulic cylinders 22. As a result, the rods 23 of the hydraulic cylinders 22 interact with the stop 24 rigidly mounted on the sleeve member 13 and produce axial pressure on the sleeve member 13, which is necessary to withdraw the fuel assembly 4 from its socket in the collector 5. As the tail of the fuel assembly 4 leaves the collector 5, the drive 29 raises the sleeve member 13, the hollow bar 6 and the fuel assembly 4, gripped by the closed auxiliary grip 10 and the main grip 7, somewhat above the heads of the fuel assemblies 4 in the reactor core 2, and the device 1 is oriented with respect to the socket, into which the removed fuel assembly 4 is to be inserted. By rotating the nut 19, the auxiliary grip 10 is released, and the fuel assembly 4 is installed by the main grip 7 into its socket in the manner described above.

The fuel assembly can also be placed in its socket by the auxiliary grip 10; in this case the main grip 7 first disengages from the head of the fuel assembly 4.

The adjacent jammed fuel assemblies 4 (FIGS. 5 and 6) are removed from the reactor core 2 as the single jammed fuel assembly 4, although in this case prior to lowering the sleeve member 13 with the auxiliary grip 10 and the hollow bar 6, the slot 30 is oriented with due regard for the position of the adjacent jammed fuel assemblies 4. All the other operations involved in the removal of jammed fuel assemblies 4 are carried out as described above.

The device 1 (FIGS. 1 and 3) is capable of the removal of empty cans of the control and safety system, as well as cans containing rods of the control and safety system. In the case of empty cans, all the operations are carried out by the auxiliary grip 10.

What is claimed is:

1. A device for removal of elements, namely, fuel assemblies and cans of a control and safety system, from a position within a core of a nuclear reactor, the elements having a first end forming a head and a second end opposite said first end, said device comprising: a hollow bar having a length longer than the length of an element to be removed, an open, core-facing end and an internal diameter sufficiently large that said hollow bar envelops said elements; means for moving said hollow bar into the core of the nuclear reactor; a main grip arranged in said hollow bar for axial movement relative to said hollow bar for gripping heads of elements to be removed; means for driving said main grip with respect to said hollow bar so that a gripped element is axially moved within said hollow bar; an auxiliary grip mounted on said core-facing end of said hollow bar for gripping a lowermost peripheral surface of said elements being removed; means for driving said auxiliary grip; said hollow bar being sufficiently long that the bar is movable into an extended position in which the bar substantially encompasses all of an element and has its core-facing end at the level of the second end of an element positioned within the core with said auxiliary grip reaching and gripping the peripheral surface at the second end of said element so that upward movement of said auxiliary grip frees a jammed element from the core without subjecting the element to tension forces, the other end of said bar being outside of the reactor.

2. A device as claimed in claim 1, which comprises a sleeve member coaxially fitted over said hollow bar and adapted for movement along said hollow bar; said auxiliary grip having a plurality of jaws with profiled external surfaces, said sleeve member enveloping said auxiliary grip and said jaws, said sleeve member having a core-facing end with a plurality of openings, the number of said openings corresponding to the number of said jaws, each of said openings being adapted to be positioned opposite one of said jaws, said sleeve member having profiled surfaces on opposite sides of said openings adapted to interact with said profiled surfaces of said jaws of said auxiliary grip to control the opening and closing of said jaws.

3. A device as claimed in claim 2, wherein said hollow bar and said sleeve member both have at least one slot extending longitudinally from the core-facing ends of the bar and the sleeve member, the length of said slots being not less than the length of said elements being removed, the location and width of said slots being determined by the shape and size of said elements to be removed and the arrangement of the elements in the reactor core.

4. A device as claimed in claim 2 further comprising means for axially moving said sleeve member with respect to said hollow bar so that said profiled surfaces of said sleeve member interact with said profiled surfaces of said jaws to open and close said jaws.

5. A device as claimed in claim 2 wherein the core-facing end of said sleeve member is profiled to interact with elements adjacent to an element to be removed to center the main grip with respect to the head of the element being removed.

* * * * *